United States Patent
Hussenbocus et al.

(10) Patent No.: US 11,984,107 B2
(45) Date of Patent: May 14, 2024

(54) AUDIO SIGNAL PROCESSING METHOD AND SYSTEM FOR ECHO SUPPRESSION USING AN MMSE-LSA ESTIMATOR

(71) Applicant: Analog Devices International Unlimited Company, Limerick (IE)

(72) Inventors: Abdel Yussef Hussenbocus, Heverlee (BE); Christophe Mansard, Brussels (BE); Stijn Robben, Boutersem (BE)

(73) Assignee: Analog Devices International Unlimited Company, Limerick (IE)

(*) Notice: Subject to any disclaimer, the term of this patent is extended or adjusted under 35 U.S.C. 154(b) by 195 days.

(21) Appl. No.: 17/863,939

(22) Filed: Jul. 13, 2022

(65) Prior Publication Data
US 2024/0021184 A1  Jan. 18, 2024

(51) Int. Cl.
*G10K 11/178* (2006.01)
*H04R 29/00* (2006.01)

(52) U.S. Cl.
CPC .......... *G10K 11/178* (2013.01); *H04R 29/00* (2013.01); *G10K 2210/505* (2013.01)

(58) Field of Classification Search
CPC . G10K 11/178; H04R 29/00; H04R 2210/505
See application file for complete search history.

(56) References Cited

U.S. PATENT DOCUMENTS

| | | | |
|---|---|---|---|
| 2005/0240401 A1* | 10/2005 | Ebenezer | G10L 21/0208 704/226 |
| 2005/0278171 A1* | 12/2005 | Suppappola | G10L 19/012 704/227 |
| 2010/0166199 A1* | 7/2010 | Seydoux | H04M 9/082 381/66 |

(Continued)

FOREIGN PATENT DOCUMENTS

WO    WO-2024012868 A1    1/2024

OTHER PUBLICATIONS

"International Application Serial No. PCT/EP2023/067535, International Search Report mailed Sep. 8, 2023", 4 pgs.

(Continued)

*Primary Examiner* — David L Ton
(74) *Attorney, Agent, or Firm* — Schwegman Lundberg & Woessner, P.A.

(57) ABSTRACT

An audio signal processing method implemented by an audio system with an audio sensor and a speaker unit includes: measuring, by the audio sensor, acoustic signals reaching the audio sensor, producing a sensor audio signal; retrieving a speaker audio signal corresponding to a speaker acoustic signal from the speaker unit while measuring the acoustic signals reaching the audio sensor to produce the sensor audio signal; converting the speaker and sensor audio signals to speaker and sensor audio spectra; estimating, based on the speaker audio spectrum, an echo audio spectrum of an echo audio signal caused by the speaker acoustic signal in the sensor audio signal; computing, based on the echo audio spectrum and the sensor audio spectrum, echo suppression gains to be applied to the sensor audio spectrum, by using a MMSE-LSA estimator; and applying the echo suppression gains to the sensor audio spectrum.

21 Claims, 4 Drawing Sheets

(56) References Cited

U.S. PATENT DOCUMENTS

| | | | | |
|---|---|---|---|---|
| 2013/0002797 | A1* | 1/2013 | Thapa | H04M 3/568 |
| | | | | 348/E7.083 |
| 2014/0064476 | A1* | 3/2014 | Mani | H04M 3/002 |
| | | | | 379/406.08 |
| 2017/0162212 | A1* | 6/2017 | Sun | G10L 21/0364 |
| 2018/0367882 | A1 | 12/2018 | Watts et al. | |
| 2021/0217435 | A1 | 7/2021 | Sun et al. | |

OTHER PUBLICATIONS

"International Application Serial No. PCT/EP2023/067535, Written Opinion mailed Sep. 8, 2023", 6 pgs.

Enzner, G, et al., "Partitioned Residual Echo Power Estimation for Frequency-Domain Acoustic Echo Cancellation and Postfiltering", European Transactions on Telecommunications, Wiley & Sons, Chichester, GB, vol. 13, No. 2, (Mar. 1, 2002), 12 pgs.

Y. Ephraim et al., "Speech Enhancement Using a Minimum Mean-Square Error Log-Spectral Amplitude Estimator", IEEE Transactions on Acoustics, Speech and Signal Processing, vol. 33, No. 2, Apr. 1985, pp. 443-445.

* cited by examiner

AUDIO SIGNAL PROCESSING METHOD AND SYSTEM FOR ECHO SUPPRESSION USING AN MMSE-LSA ESTIMATOR

BACKGROUND OF THE INVENTION

Field of the Invention

The present disclosure relates to audio signal processing and relates more specifically to a method and computing system for suppressing an echo in an audio signal provided by an audio sensor, caused by a speaker unit, by using a speaker audio signal of the speaker unit and a Minimum Mean Square Error-Log Spectral Amplitude (MMSE-LSA) estimator.

The present disclosure finds an advantageous application, although in no way limiting, in wearable devices such as earbuds or earphones or smart glasses used to pick-up voice for a voice call established using any voice communicating device, or for voice commands.

Description of the Related Art

To improve picking up a user's voice in noisy environments, wearable devices like earbuds or earphones are typically equipped with different types of audio sensors such as microphones and/or accelerometers.

On a small wearable device such as an earbud, there is a very short acoustic path from a speaker unit of the earbud to the audio sensors that pick-up the user's voice. As a consequence, the audio sensors may also pick-up the acoustic signal output by the speaker unit at possibly high volume.

During a voice call, the speaker unit outputs the far-end speaker's voice for the user of the earbud. Due to the very short acoustic path from the speaker unit to the audio sensors that pick-up the user's voice, the audio sensors may also pick-up the far-end speaker's voice, from the speaker unit, which is then returned (with the user's voice) to the far-end speaker. This produces an echo for the far-end speaker who will then hear their own voice.

In order to prevent the far-end speaker from hearing their own voice, it is known to implement an echo mitigation algorithm on the earbud of the user. This echo mitigation algorithm uses the speaker audio signal played by the speaker unit (i.e. the audio signal converted by the speaker unit into an acoustic signal) as an echo reference to reduce the echo affecting the audio signals produced by the various audio sensors of the earbud. In the present disclosure, an echo mitigation algorithm can implement echo cancellation and/or echo suppression. An echo cancellation algorithm typically estimates the echo affecting an audio signal and removes the estimated echo from the audio signal affected by said echo (typically by subtracting said estimated echo), in principle without modifying the useful part of the audio signal. An echo cancellation algorithm can use e.g. an adaptive linear filter. Such an adaptive linear filter is applied to the speaker audio signal and is dynamically adapted by minimizing a power of a difference between the filtered speaker audio signal and the audio signal provided by an audio sensor of the earbud. The filtered speaker audio signal is then subtracted from the audio signal of the audio sensor, thereby reducing the echo in said audio signal of the audio sensor without reducing the useful part of the audio signal (in principle). An echo suppression algorithm attenuates the frequency components of the audio signal which are strongly affected by echo, thereby also attenuating the useful part of the audio signal in the attenuated frequency components of the audio signal.

However, existing echo mitigation algorithms can usually only handle a certain amount of echo either because the echo level is really high, or because it contains components which are non-linear with respect to the speaker audio signal used as echo reference and that cannot be modelled by standard echo cancellation algorithms based on adaptive linear filtering. Non-linear components of the echo are due inter alia to the speaker unit's response and to vibrations of the earbud caused by the speaker unit, which propagate to the audio sensors.

Accordingly, there is a need for a solution enabling to enhance echo mitigation in audio signals provided by an audio sensor of a wearable device such as e.g. an earbud, in particular for enhancing the reduction of components of the echo which are non-linear with respect to the speaker audio signal fed to the speaker unit.

SUMMARY OF THE INVENTION

The present disclosure aims at improving the situation. In particular, the present disclosure aims at overcoming at least some of the limitations of the prior art discussed above, by proposing a solution enabling to enhance echo mitigation in wearable audio devices such as e.g. earbuds.

For this purpose, and according to a first aspect, the present disclosure relates to an audio signal processing method implemented by an audio system which comprises at least an audio sensor and a speaker unit, wherein the speaker unit is configured to convert a speaker audio signal received as input into a speaker acoustic signal which is output by the speaker unit for a user of the audio system, wherein the audio signal processing method comprises:

measuring, by the audio sensor, acoustic signals reaching the audio sensor, thereby producing a sensor audio signal, retrieving the speaker audio signal corresponding to the speaker acoustic signal output by the speaker unit while measuring the acoustic signals reaching the audio sensor to produce the sensor audio signal, converting the speaker audio signal to frequency domain, thereby producing a speaker audio spectrum, converting the sensor audio signal to frequency domain, thereby producing a sensor audio spectrum, estimating, based on the speaker audio spectrum, an echo audio spectrum of an echo audio signal caused by the speaker acoustic signal in the sensor audio signal, computing, based on the echo audio spectrum and the sensor audio spectrum, echo suppression gains to be applied to the sensor audio spectrum, by using a Minimum Mean Square Error-Log Spectral Amplitude, MMSE-LSA, estimator, applying the echo suppression gains to the sensor audio spectrum.

Hence the proposed solution relies also on the speaker audio signal which is provided as input to the speaker unit (and converted into a speaker acoustic signal by the speaker unit, which may reach the audio sensor and cause echo) as an echo reference. However, unlike prior art solutions which rely on a time or frequency domain adaptive linear filter applied to the speaker audio signal, the proposed solution relies on a frequency domain echo suppression.

More specifically, the speaker audio spectrum (speaker audio signal converted to frequency domain), at least, is used to estimate an echo audio spectrum representing the part of the sensor audio spectrum (sensor audio signal converted to frequency domain) which corresponds to echo.

It should be noted that, in the present disclosure, an audio spectrum may be either an audio magnitude spectrum or an audio complex spectrum. An audio magnitude spectrum corresponds to an audio spectrum which comprises, for each considered frequency, a magnitude value (i.e. a real positive value) representative of the power of the considered audio signal at the considered frequency. An audio complex spectrum corresponds to an audio spectrum which comprises, for each considered frequency, a complex value which includes both a magnitude value and a phase value. Hence, an audio complex spectrum includes an audio magnitude spectrum, augmented with phase values. In the present disclosure, the sensor audio spectrum needs to be an audio complex spectrum in order to be able to determine an enhanced audio sensor signal in time domain. For the speaker audio spectrum and the echo audio spectrum, it is possible to consider only magnitude values, such that the speaker audio spectrum and the echo audio spectrum do not need to be audio complex spectra and may consist in audio magnitude spectra.

It should be noted that, due to the processing in frequency domain, the echo audio spectrum can be computed independently for each considered frequency, without making any assumption on whether the acoustic path from the speaker unit to the audio sensor is linear or not.

Then, the proposed solution uses the MMSE-LSA estimator for computing echo suppression gains, based on the estimated echo audio spectrum and based on the sensor audio spectrum.

The MMSE-LSA estimator is a well-known algorithm for denoising and for speech enhancement (i.e. for making speech sound more natural), and the inventors have found that it could also be used for echo suppression. The MMSE-LSA estimator minimizes the mean square error of logarithmically weighted amplitudes. Hence, the MMSE-LSA estimator requires only magnitude values (amplitudes) for the estimated echo audio spectrum and for the sensor audio spectrum (i.e. no phase values required). The MMSE-LSA estimator determines echo suppression gains minimizing the mean square error without making any assumption on whether the acoustic path from the speaker unit to the audio sensor is linear or not.

The echo suppression gains are then applied to the sensor audio spectrum, to modify the magnitudes of said sensor audio spectrum in order to produce an enhanced sensor audio (complex) spectrum in which the respective powers of the echo spectral components have been attenuated in a frequency selective manner. For instance, this enhanced sensor audio (complex) spectrum may be converted back to time domain to produce an enhanced sensor audio signal.

It should be noted that, for the reasons given above, the performance of the echo suppression is not dependent on whether the acoustic path from the speaker unit to the audio sensor is linear or not. For this reason, the proposed solution enables to attenuate components of the echo which are non-linear with respect to the speaker audio signal fed to the speaker unit.

Also, it should be noted that the proposed solution can be used alone, or in combination with conventional echo cancellation algorithms.

In specific embodiments, the audio signal processing method may further comprise one or more of the following optional features, considered either alone or in any technically possible combination.

In specific embodiments, estimating the echo audio spectrum comprises:
  determining a spectral transfer function of an acoustic path from the speaker unit to the audio sensor,
  determining the echo audio spectrum by applying the spectral transfer function to the speaker audio spectrum.

In specific embodiments, the spectral transfer function is predetermined independently from the speaker audio spectrum and the sensor audio spectrum.

In specific embodiments, the spectral transfer function is dynamically adapted based on the speaker audio spectrum and the sensor audio spectrum.

In specific embodiments, the audio signal processing method further comprises evaluating whether a spectral transfer function updating criterion is satisfied and, responsive to the spectral transfer function updating criterion being satisfied, updating the spectral transfer function by comparing the speaker audio spectrum and the sensor audio spectrum.

In specific embodiments, evaluating whether the spectral transfer function updating criterion is satisfied comprises at least one among the following:
  determining whether the sensor audio signal includes a voice audio signal corresponding to a voice acoustic signal emitted by the user, wherein the spectral transfer function updating criterion is satisfied when it is determined that the sensor audio signal does not include a voice audio signal, and/or
  determining whether the sensor audio signal includes a noise audio signal having a noise level below a predetermined noise threshold, wherein the spectral transfer function updating criterion is satisfied when it is determined that the noise level is below said predetermined noise threshold, and/or
  determining whether the sensor audio signal includes an echo audio signal having an echo level above a predetermined echo threshold, wherein the spectral transfer function updating criterion is satisfied when it is determined that the echo level is above said predetermined echo threshold.

In specific embodiments, the spectral transfer function updating criterion is evaluated for a plurality of frequencies or frequency sub-bands and the spectral transfer function is updated for each frequency or frequency sub-band for which the spectral transfer function updating criterion is satisfied.

In specific embodiments, spectral transfer functions determined successively are smoothed over time.

In specific embodiments, the audio signal processing method further comprises smoothing in frequency the echo suppression gains, or the sensor audio spectrum obtained after applying the echo suppression gains.

In specific embodiments, the echo suppression gains are constrained by one or more minimum possible values predetermined for said the echo suppression gains.

In specific embodiments, the audio system comprises two or more audio sensors which comprise an internal sensor and an external sensor, wherein the internal sensor is arranged to measure acoustic signals which reach the internal sensor by propagating internally to a head of the user and the external sensor is arranged to measure acoustic signals which reach the external sensor by propagating externally to the user's head, wherein:
  echo suppression gains are computed on a first frequency band for an internal audio spectrum of an internal audio signal produced by the internal sensor, echo suppression gains are computed on a second frequency band for an external audio spectrum of an external audio signal produced by the external sensor, wherein the second frequency band is different from the first frequency band and includes frequencies which are greater than a maximum frequency of the first frequency band.

In specific embodiments, the MMSE-LSA estimator includes a computation of signal to echo ratio, SER, probabilities and SER probabilities determined successively and smoothed over time.

In specific embodiments, the MMSE-LSA estimator uses an exponential integral function which is approximated by a linear function.

According to a second aspect, the present disclosure relates to an audio system comprising at least an audio sensor and a speaker unit, wherein the speaker unit is configured to convert a speaker audio signal received as input into a speaker acoustic signal which is output by the speaker unit and the audio sensor is arranged to measure a voice acoustic signal emitted by a user of the audio system, wherein the audio sensor is configured to produce a sensor audio signal by measuring acoustic signals reaching the audio sensor, wherein said audio system further comprises a processing circuit configured to:
 retrieve the speaker audio signal corresponding to the speaker acoustic signal output by the speaker unit while measuring the acoustic signals reaching the audio sensor to produce the sensor audio signal,
 convert the speaker audio signal to frequency domain, thereby producing a speaker audio spectrum,
 convert the sensor audio signal to frequency domain, thereby producing a sensor audio spectrum,
 estimate, based on the speaker audio spectrum, an echo audio spectrum of an echo audio signal caused by the speaker acoustic signal in the sensor audio signal,
 compute, based on the echo audio spectrum and the sensor audio spectrum, echo suppression gains to be applied to the sensor audio spectrum, by using a Minimum Mean Square Error-Log Spectral Amplitude, MMSE-LSA, estimator,
 apply the echo suppression gains to the sensor audio spectrum.

According to a third aspect, the present disclosure relates to a non-transitory computer readable medium comprising computer readable code to be executed by an audio system comprising at least an audio sensor and a speaker unit, wherein the speaker unit is configured to convert a speaker audio signal received as input into a speaker acoustic signal which is output by the speaker unit and the audio sensor is arranged to measure a voice acoustic signal emitted by a user of the audio system, wherein said audio system further comprises a processing circuit, wherein said computer readable code causes said audio system to:
 measure, by the audio sensor, acoustic signals reaching the audio sensor, thereby producing a sensor audio signal,
 retrieve the speaker audio signal corresponding to the speaker acoustic signal output by the speaker unit while measuring the acoustic signals reaching the audio sensor to produce the sensor audio signal,
 convert the speaker audio signal to frequency domain, thereby producing a speaker audio spectrum,
 convert the sensor audio signal to frequency domain, thereby producing a sensor audio spectrum,
 estimate, based on the speaker audio spectrum, an echo audio spectrum of an echo audio signal caused by the speaker acoustic signal in the sensor audio signal,
 compute, based on the echo audio spectrum and the sensor audio spectrum, echo suppression gains to be applied to the sensor audio spectrum, by using a Minimum Mean Square Error-Log Spectral Amplitude, MMSE-LSA, estimator,
 apply the echo suppression gains to the sensor audio spectrum.

BRIEF DESCRIPTION OF DRAWINGS

The invention will be better understood upon reading the following description, given as an example that is in no way limiting, and made in reference to the figures which show.

In these figures, references identical from one figure to another designate identical or analogous elements. For reasons of clarity, the elements shown are not to scale, unless explicitly stated otherwise.

Also, the order of steps represented in these figures is provided only for illustration purposes and is not meant to limit the present disclosure which may be applied with the same steps executed in a different order.

DESCRIPTION OF THE PREFERRED EMBODIMENTS

Figure 1:
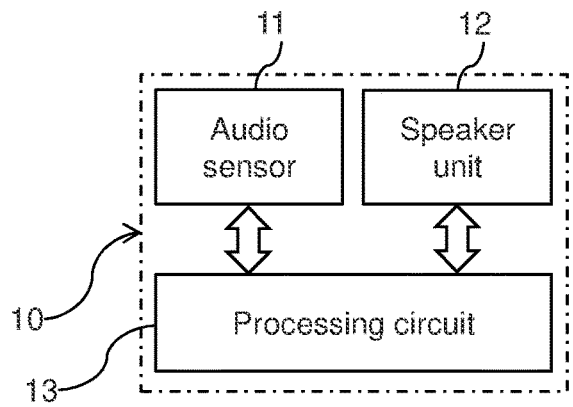
FIG. 1: a schematic representation of an exemplary embodiment of an audio system.

FIG. 1 represents schematically an exemplary embodiment of an audio system 10. In some cases, the audio system 10 is included in a device wearable by a user. In preferred embodiments, the audio system 10 is included in earbuds or in earphones or in smart glasses.

As illustrated by FIG. 1, the audio system 10 comprises at least one audio sensor 11 configured to measure voice acoustic signals emitted by the user of the audio system 10. For instance, the audio sensor 11 may be an air conduction sensor (e.g. microphone), or a bone conduction sensor (e.g. accelerometer, vibration sensor). The audio sensor 11 may be any type of bone conduction sensor or air conduction sensor known to the skilled person.

As illustrated by FIG. 1, the audio system 10 comprises also at least one speaker unit 12. In a conventional manner, each speaker unit 12 receives as input an audio signal, referred to as speaker audio signal, and converts it into an acoustic signal (wave), referred to as speaker acoustic signal, for the user of the audio system 10.

As illustrated by FIG. 1, the audio system 10 comprises also a processing circuit 13 connected to the audio sensor 11.

The processing circuit 13 is configured to receive and to process the audio signals produced by the audio sensor 11. The processing circuit 13 is also connected to the speaker unit(s) 12. The processing circuit 13 has access to (and may even generate) the speaker audio signal(s) played by the speaker unit(s) 12.

In some embodiments, the processing circuit 13 comprises one or more processors and one or more memories. The one or more processors may include for instance a central processing unit (CPU), a graphical processing unit (GPU), a digital signal processor (DSP), a field-programmable gate array (FPGA), an application specific integrated circuit (ASIC), etc. The one or more memories may include any type of computer readable volatile and non-volatile memories (magnetic hard disk, solid-state disk, optical disk, electronic memory, etc.). The one or more memories may store a computer program product (software), in the form of a set of program-code instructions to be executed by the one or more processors in order to implement all or part of the steps of an audio signal processing method 20.

Figure 2:
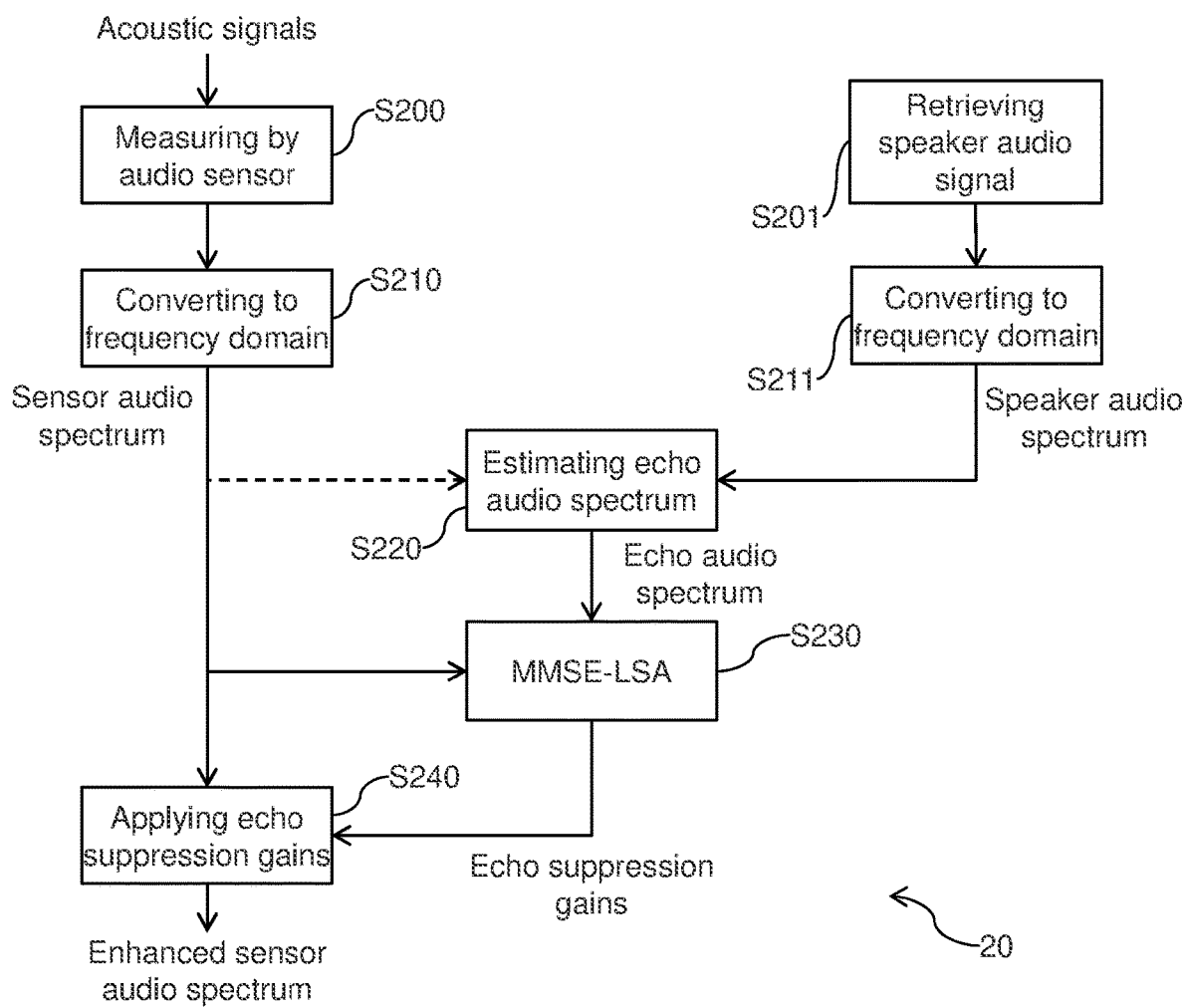
FIG. 2: a diagram representing the main steps of a first exemplary embodiment of an audio signal processing method.

FIG. 2 represents schematically the main steps of an exemplary embodiment of an audio signal processing method 20 for mitigating echo, which are carried out by the audio system 10.

As illustrated by FIG. 2, the audio sensor 11 measures acoustic signals reaching said audio sensor 11, thereby producing an audio signal referred to as sensor audio signal (step S200).

The acoustic signals reaching the audio sensor 11 may or may not include a voice acoustic signal emitted by the user, with the presence of a voice activity varying over time as the user speaks.

During e.g. a voice call, the speaker unit 12 typically emits a speaker acoustic signal for the user (which or may not include the far-end speaker's voice). In this case, the acoustic signals reaching the audio sensor 11, measured during step S200, may include the speaker acoustic signal emitted by the speaker unit 12. This speaker acoustic signal, output by the speaker unit 12 when measuring the acoustic signals by the audio sensor 11, is the result of the conversion of a speaker audio signal fed as input to said speaker unit 12. As illustrated by FIG. 2, the audio signal processing method 20 comprises a step S201 of retrieving, by the processing circuit 13, the speaker audio signal which corresponds to the speaker acoustic signal which may be included in the acoustic signals measured by the audio sensor 11 when producing the sensor audio signal.

As illustrated by FIG. 2, the audio signal processing method 20 comprises a step S210 of converting the sensor audio signal to frequency domain, executed by the processing circuit 13, which produces an audio spectrum referred to as sensor audio spectrum. Similarly, the audio signal processing method 20 comprises a step S211 of converting the speaker audio signal to frequency domain, executed by the processing circuit 13, which produces an audio spectrum referred to as speaker audio spectrum.

Indeed, the sensor audio signal and the speaker audio signal are in time domain and steps S210 and S211 aim at performing a spectral analysis of the sensor and speaker audio signals to obtain respective audio spectra in frequency domain. In some examples, steps S210 and S211 may for instance use any time to frequency conversion method, for instance a Fast Fourier Transform (FFT), a Discrete Fourier Transform (DFT), a Discrete Cosine Transform (DCT), a wavelet transform, etc. In other examples, steps S210 and S211 may for instance use a bank of bandpass filters which filter the audio signals in respective frequency sub-bands of a same frequency band, etc.

For instance, the sensor and speaker audio signals may be sampled at e.g. 16 kilohertz (kHz) and buffered into time-domain audio frames of e.g. 4 milliseconds (ms). For instance, it is possible to apply on these audio frames a 128-point DCT or FFT to produce audio spectra up to the Nyquist frequency $f_{Nyquist}$, i.e. half the sampling rate (i.e. 8 kHz if the sampling rate is 16 kHz).

In the sequel, we assume in a non-limitative manner that the frequency band on which are determined the sensor audio spectrum and the speaker audio spectrum are composed of N discrete frequency values $f_n$ with $1 \leq n \leq N$, wherein $f_{n-1} < f_n$ for any $2 \leq n \leq N$. For instance, $f_1 = 0$ and $f_N = f_{Nyquist}$, but the spectral analysis may also be carried out on a frequency sub-band in $[0, f_{Nyquist}]$. For instance, $f_1 = 0$ and $f_N$ is lower than or equal to 4000 Hz, or lower than or equal to 3000 Hz. It should be noted that the determination of the audio spectra may be performed with any suitable spectral resolution. Also, the frequencies $f_n$ may be regularly spaced in some embodiments or irregularly spaced in other embodiments.

The sensor audio spectrum $X_f$ of the sensor audio signal $x_t$ corresponds to a set of values $\{X_f(f_n), 1 \leq n \leq N\}$. The speaker audio spectrum $S_f$ of the speaker audio signal $s_t$ corresponds to a set of values $\{S_f(f_n), 1 \leq n \leq N\}$. Typically, the sensor audio spectrum $X_f$ corresponds to a complex spectrum such that $X_f(f_n)$ comprises both:

a magnitude value representative of the power of the sensor audio signal $x_t$ at frequency $f_n$,
  a phase value of the sensor audio signal $x_t$ at the frequency $f_n$.

The speaker audio spectrum $S_f$ corresponds for instance also to a complex spectrum comprising both a magnitude value and a phase value for each frequency $f_n$. However, it is possible to use only the magnitudes values for the speaker audio signal such that the speaker audio spectrum $S_f$ may consist in a magnitude spectrum. In the following, we consider in a non-limitative manner that the determined speaker audio spectrum $S_f$ corresponds to a complex spectrum.

For instance, if the sensor audio spectrum is computed by an FFT, then $X_f(f_n)$ can correspond to $FFT[x_t](f_n)$. The corresponding magnitude spectrum is designated by $\|X_f\|$, wherein $\|X_f(f_n)\|$ corresponds for instance to $|X_f(f_n)|$ (i.e. modulus or absolute value of $X_f(f_n)$), or to $|X_f(f_n)|^2$ (i.e. power of $X_f(f_n)$). Similarly, if the speaker audio spectrum is computed by an FFT, then $S_f(f_n)$ can correspond to $FFT[s_t](f_n)$. The corresponding magnitude spectrum is designated by $\|S_f\|$, wherein $\|S_f(f_n)\|$ corresponds for instance to $|S_f(f_n)|$ (i.e. modulus or absolute value of $S_f(f_n)$), or to $|S_f(f_n)|^2$ (i.e. power of $S_f(f_n)$).

It should be noted that, in some embodiments, the sensor and speaker audio spectra can optionally be smoothed over time, for instance by using exponential averaging with a configurable time constant.

As illustrated by FIG. 2, the audio signal processing method 20 comprises a step S220 of estimating, by the processing circuit 13 and based at least on the speaker audio spectrum, an echo audio spectrum of an echo audio signal caused by the speaker acoustic signal in the sensor audio signal. In other words, the speaker audio spectrum is used to estimate the audio spectrum of the part of the sensor audio signal which represents the measurement of the speaker acoustic signal by the audio sensor 11.

Figure 3:
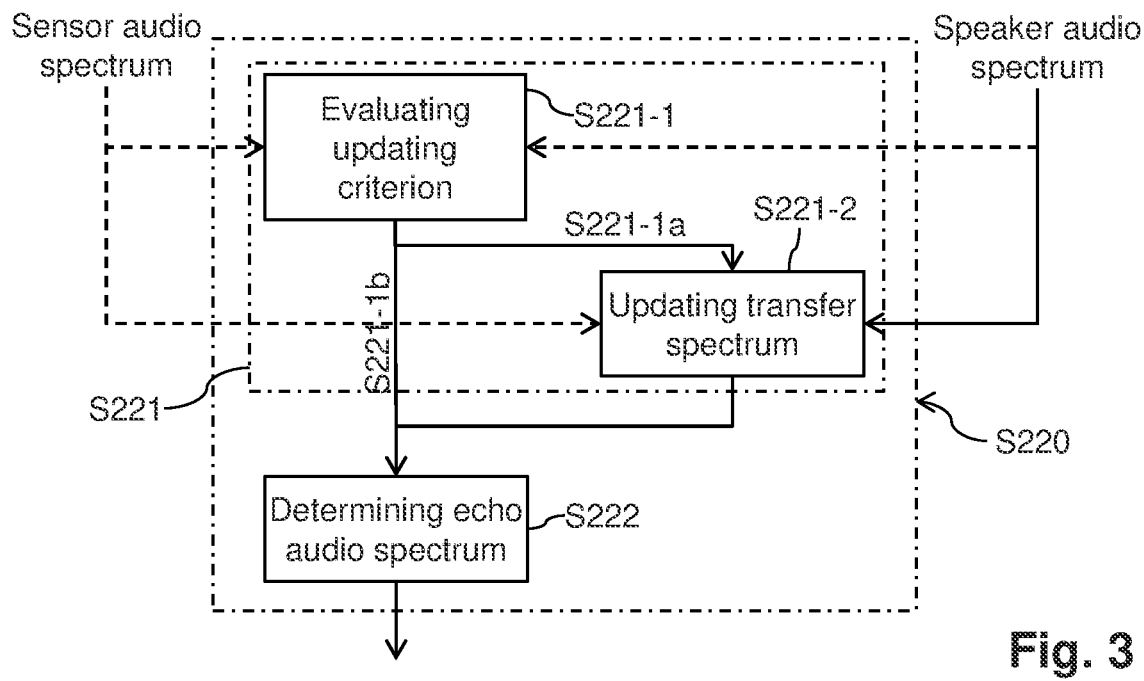
FIG. 3: a diagram representing the main steps of an exemplary embodiment of an echo audio spectrum estimation step.

FIG. 3 represents schematically the main steps of an exemplary embodiment of the step S220 of estimating the echo audio spectrum. As illustrated by FIG. 3, step S220 comprises:
- a step S221 of determining a spectral transfer function of an acoustic path from the speaker unit 12 to the audio sensor 11,
- a step S222 of determining the echo audio spectrum by applying the spectral transfer function to the speaker audio spectrum.

Basically, the spectral transfer function is an estimate of the frequency domain response of the acoustic path which includes the speaker unit 12, a propagation channel between the speaker unit 12 and the audio sensor 11, and the audio sensor 11. As for the audio spectra, the determined spectral transfer function can be composed of magnitude values or complex values. However, it is possible to use only magnitude values for the spectral transfer function. In the sequel, we consider in a non-limitative manner that the spectral transfer function is composed of magnitude values and is designated by $\|W_f\|$. Similarly, the estimated echo audio spectrum can be a complex spectrum or a magnitude spectrum. However, it is possible to use only magnitude values for the echo audio spectrum. In the sequel, we consider in a non-limitative manner that the estimated echo audio spectrum is a magnitude spectrum, designated by $\|E_f\|$. The spectral transfer function $\|W_f\|$ is applied to the speaker audio spectrum, on a frequency by frequency basis, for instance as follows (with $f_1 \leq f_n \leq f_N$):

$$\|E_f(f_n)\| = \|W_f(f_n)\| \|S_f(f_n)\|$$

The spectral transfer function $\|W_f\|$ may be predefined and remain static over time. For instance, the spectral transfer function may be obtained beforehand, e.g. by calibration of the acoustic path (which includes the speaker unit 12, a propagation channel between the speaker unit 12 and the audio sensor 11, and the audio sensor 11), independently from the speaker audio spectrum and the sensor audio spectrum computed for the current audio frame.

In preferred embodiments, and as illustrated by FIG. 3, the spectral transfer function $\|W_f\|$ is dynamically adapted based on the speaker audio spectrum and the sensor audio spectrum computed for the current audio frame. For instance, the spectral transfer function $\|W_f\|$ may be determined by comparing the current speaker audio spectrum and the current sensor audio spectrum (i.e. computed for the current audio frame). Indeed, in the presence of echo and in the absence of both noise and voice activity, then $X_f(f_n) \approx E_f(f_n)$. The comparison of the current speaker audio spectrum and the current sensor audio spectrum depends only the spectral transfer function, which may be computed as follows:

$$\|W_f(f_n)\| = \frac{\|X_f(f_n)\|}{\|S_f(f_n)\|}$$

Hence, in preferred embodiments, and as illustrated by FIG. 3, the step S221 of determining the transfer function comprises a step S221-1 of evaluating whether a spectral transfer function updating criterion is satisfied. As illustrated by FIG. 3, when the spectral transfer function updating criterion is satisfied (reference S221-1a in FIG. 3), then the step S221 of determining the transfer function comprises a step S221-2 of updating the spectral transfer function by comparing the current speaker audio spectrum and the current sensor audio spectrum. If the spectral transfer function updating criterion is not satisfied (reference S221-1b in FIG. 3), then the spectral transfer function is not updated, and the previous spectral transfer function can be used during step S222 of determining the echo audio spectrum, by applying the previous spectral transfer function to the current speaker audio spectrum. For instance, the audio signal processing method 20 may initially use a predefined spectral transfer function (obtained e.g. by calibration) which is then updated iteratively each time the spectral transfer function updating criterion is satisfied.

Basically, the spectral transfer function updating criterion aims at determining whether or not the current speaker audio spectrum and the current sensor audio spectrum are suitable for updating the spectral transfer function. As already discussed above, parameters that may be taken into account include e.g.:
- the amount of noise (a noisy environment, which affects only the sensor audio spectrum, degrades the accuracy of the estimation of the spectral transfer function),
- the amount of echo (a low echo might be difficult to distinguish from e.g. noise and/or the user's voice, and no echo prevents from being able to estimate the spectral transfer function),
- the presence of the user's voice (the user's voice, which affects only the sensor audio spectrum, degrades the accuracy of the estimation of the spectral transfer function).

Accordingly, the spectral transfer function updating criterion may evaluate at least one among the presence of noise, the presence of echo and the presence of the user's voice.

For instance, evaluating whether the spectral transfer function updating criterion is satisfied may comprise determining whether the sensor audio signal includes a voice audio signal corresponding to a voice acoustic signal emitted by the user, and the spectral transfer function updating criterion is satisfied when it is determined that the sensor audio signal does not include a voice audio signal. The present disclosure may use any voice activity detection method known to the skilled person, and the choice of a specific method corresponds to a specific and non-limitative embodiment of the present disclosure.

Alternatively, or in combination thereof, evaluating whether the spectral transfer function updating criterion is satisfied may comprise determining whether the sensor audio signal includes a noise audio signal having a noise level (wherein the noise level is representative of the power of the noise) below a predetermined noise threshold, and the spectral transfer function updating criterion is satisfied when it is determined that the noise level is below said predetermined noise threshold. The present disclosure may use any noise level estimation method known to the skilled person, and the choice of a specific method corresponds to a specific and non-limitative embodiment.

Alternatively, or in combination thereof, evaluating whether the spectral transfer function updating criterion is satisfied may comprise determining whether the sensor audio signal includes an echo audio signal having an echo level (estimated for instance by determining the level/power of the speaker audio signal) above a predetermined echo threshold, and the spectral transfer function updating criterion is satisfied when it is determined that the echo level is above said predetermined echo threshold. The present disclosure may use any echo level estimation method known to the skilled person, and the choice of a specific method corresponds to a specific and non-limitative embodiment.

The spectral transfer function corresponds for instance to a set of weights $\{\|W_f(f_n)\|, 1 \leq n \leq N\}$. It should be noted that the spectral transfer function updating criterion can be evaluated for the whole frequency band $[f_1, f_N]$, or it can be evaluated independently for different sub-bands of the frequency band or even for each frequency $f_n$. Hence, it is possible in some cases to update selectively only some of the weights $\|W_f(f_n)\|$. For instance, it is possible to update only the weight $\|W_f(f_{n'})\|$ (and not the weights $\|W_f(f_n)\|$ with $n \neq n'$) if the spectral transfer function updating criterion is satisfied only for the frequency $f_{n'}$. In such cases, the noise level, the voice presence or the echo level are evaluated separately for each considered sub-band or each considered frequency.

In some embodiments, spectral transfer functions determined successively for successive audio frames can be smoothed over time. Such a smoothing may for instance be performed using exponential averaging with a predetermined time constant. Preferably, asymmetric exponential averaging may be used with predetermined attack and release time constants to enable e.g. faster decrease of the weights $\|W_f(f_n)\|$ compared to increase of the weights.

As illustrated by FIG. 2, the audio signal processing method 20 comprises a step S230 of computing, by the processing circuit 13 and based on the echo audio spectrum and on the sensor audio spectrum, echo suppression gains to be applied to the sensor audio (complex) spectrum. The echo suppression gains are computed by using a Minimum Mean Square Error-Log Spectral Amplitude, MMSE-LSA, estimator.

The MMSE-LSA estimator is a well-known algorithm for denoising and for speech enhancement (i.e. for making speech sound more natural), see for instance [EPHRAIM85], the contents of which are hereby incorporated by reference in its entirety. The MMSE-LSA estimator is a recursive algorithm which minimizes the mean square error of logarithmically weighted amplitudes. Hence, the MMSE-LSA estimator requires only magnitude values (amplitudes) for the estimated echo audio spectrum and for the sensor audio spectrum (i.e. no phase values required). In the sequel, the MMSE-LSA is applied on the estimated echo audio (magnitude) spectrum $\|E_f\|$ and on the sensor audio (magnitude) spectrum $\|X_f\|$.

Figure 4:
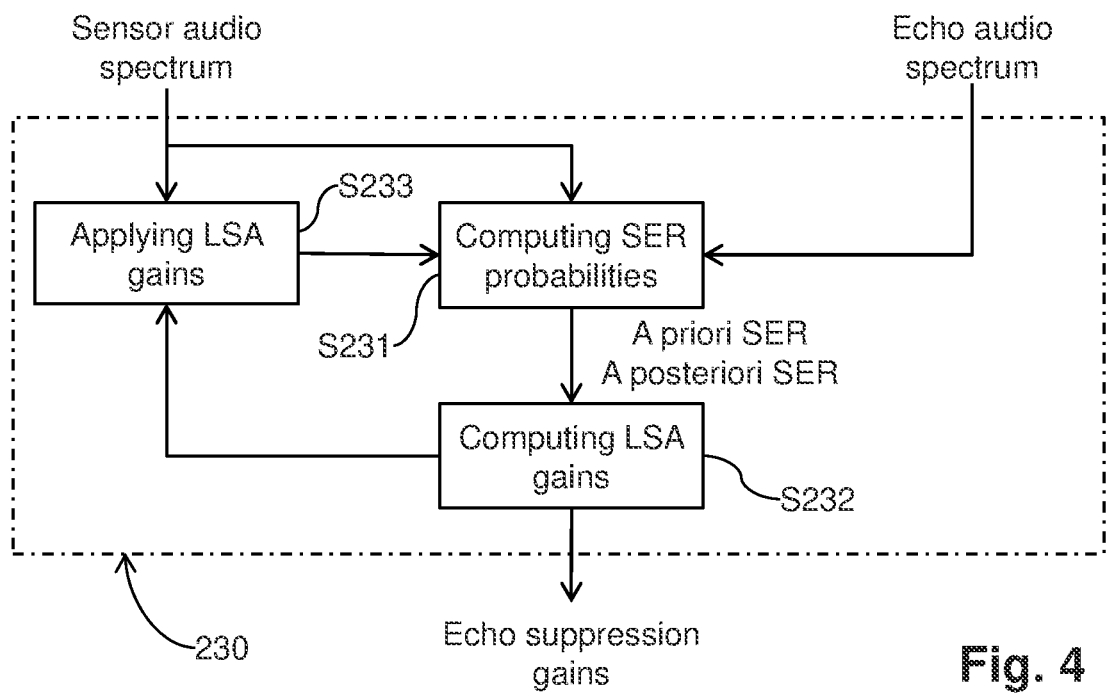
FIG. 4: a diagram representing the main steps of an MMSE-LSA estimator.

FIG. 4 represents schematically the main steps of the MMSE-LSA estimator, which are considered known to the skilled person.

As illustrated by FIG. 4, the MMSE-LSA estimator comprises a step S231 of computing, based on the estimated echo audio (magnitude) spectrum and on the sensor audio (magnitude) spectrum, spectral intermediary values which are referred to as signal to echo ratio, SER, probabilities. It should be noted that, when the MMSE-LSA is used for denoising, these spectral intermediary values are typically referred to as signal to noise ratio, SNR, probabilities. In a conventional manner, the SER probabilities include an a priori SER and an a posteriori SER. The a priori SER represents the power ratio between the estimated clean (i.e. echo-free) sensor audio (magnitude) spectrum and the estimated echo audio (magnitude) spectrum. The a posteriori SER represents the power ratio between the observed sensor audio (magnitude) spectrum (i.e. including echo) and the estimated echo audio (magnitude) spectrum.

In some embodiments, the SER probabilities determined successively for successive audio frames may be smoothed over time to homogenize the behavior of the system, with a tradeoff in amount of echo removed.

The MMSE-LSA estimator then comprises a step S232 of computing LSA gains which are the result of a spectral LSA gain function of both the a priori SER and the a posteriori SER, which aims at finding the ideal gains that maximize the output SER.

The LSA gain function is usually based on the exponential integral function, which may be rather heavy in terms of computational complexity, and not straightforward to implement. In preferred embodiments, mathematical properties of the exponential integral function are leveraged to derive a linear approximation, which can be adjusted via a single slope factor. Such a linear function approximating the exponential integral function is lighter in terms of computational complexity and gives accurate enough results in most cases.

As illustrated by FIG. 4, the MMSE-LSA estimator comprises a step S233 of applying the LSA gains to the sensor audio (magnitude) spectrum to obtain the clean sensor audio (magnitude) spectrum that is fed back into the step S231 of computing the SER probabilities for computing the a priori SER.

The LSA gains correspond to the echo suppression gains output during step S230 of the audio signal processing method 20. The echo suppression gains (which are non-complex gains) are referred to by $\|G_f(f_n)\|$. The echo suppression gains aim at attenuating the magnitude of frequency components of the sensor audio spectrum which are impacted by echo. Accordingly, the echo suppression gains are typically such that $0 < \|G_f(f_n)\| \leq 1$ (i.e. negative when expressed in decibels, dB, $\|G_f(f_n)\|_{dB} \leq 0$).

In some embodiments, the echo suppression gains may be constrained by one or more minimum possible values predetermined for said echo suppression gains. This enables, for instance, to control to some extent how much echo is suppressed and to prevent from strongly attenuating non-echo content in case the amount of echo was overestimated. If we denote by $\|G_{min}\|$ the minimum possible value, then the echo suppression gains may be such that $\|G_{min}\| \leq \|G_f(f_n)\|$. For instance, $\|G_{min}\|_{dB} = -30$ dB or $\|G_{min}\|_{dB} = -10$ dB or $\|G_{min}\|_{dB} = -6$ dB. It should be noted that it is possible to have different minimum possible values associated to different frequencies or frequency sub-bands, i.e. $\|G_{min}(f_n)\|$ may vary with the frequency $f_n$. This enables e.g. to be more aggressive in frequency sub-bands where echo is likely to be more present, and more conservative in frequency sub-bands where the sensor audio spectrum is likely to include e.g. voice and needs to be preserved.

As illustrated by FIG. 2, the audio signal processing method 20 comprises then a step S240 of applying the echo suppression gains to the sensor audio spectrum. As discussed above, the echo suppression gains, which aim at attenuating the magnitude of the frequency components of the sensor audio spectrum which are impacted by echo, are applied to the sensor audio complex spectrum to obtain an enhanced sensor audio (complex) spectrum denoted $\tilde{X}_f$. The echo suppression gains may be applied as follows:

$$\tilde{X}_f(f_n) = \|G_f(f_n)\| X_f(f_n)$$

Of course, the enhanced sensor audio spectrum $\tilde{X}_f$ may be converted back to time domain to produce an enhanced sensor audio signal $\tilde{x}_t$ (not represented in the figures). However, the conversion to time domain may also be performed at a later stage, after performing additional processing steps in frequency domain on the enhanced sensor audio spectrum $\tilde{X}_f$ (for instance, filtering $\tilde{X}_f$, denoising $\tilde{X}_f$, combining $\tilde{X}_f$ with other audio spectra, etc.).

Figure 5:
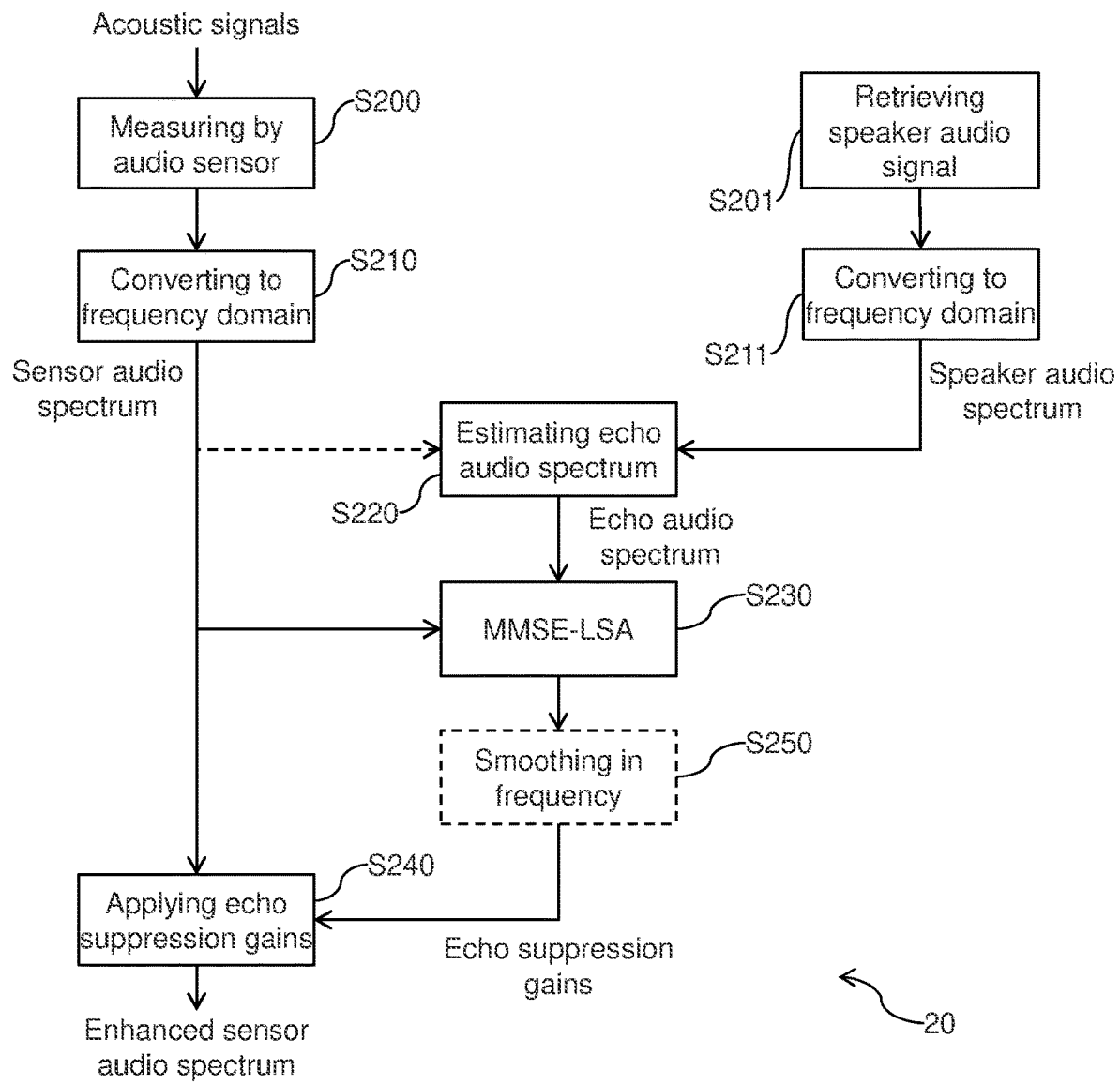
FIG. 5: a diagram representing the main steps of a second exemplary embodiment of the audio signal processing method.

FIG. 5 represents schematically the main steps of another exemplary embodiment of the audio signal processing method 20.

In addition to the steps discussed in relation to FIG. 2, the audio signal processing method 20 of FIG. 5 further comprises a step S250 of smoothing the echo suppression gains in frequency, executed by the processing circuit 13. Indeed, a known issue of the MMSE-LSA estimator is the formation of audio artifacts, similar to artificial "musical" tones/harmonics, in the higher part of the audio spectrum (typically above 2 kHz). This phenomenon is seemingly due to a lack of content in the higher part of the input audio spectra which prevents the MMSE-LSA estimator from computing meaningful echo suppression gains in these frequencies. This can cause sharp unnatural peaks in the echo suppression gain function, and therefore in the enhanced sensor audio spectrum $\tilde{X}_f$. To mitigate this effect, the step S250 of smoothing the echo suppression gains in frequency domain aims at reducing or removing these peaks. This smoothing, when present, is performed at least in the higher part of the audio spectrum (e.g. above 2 kHz). This can be done, for instance, by detecting peaks in the echo suppression gains by e.g. by comparing each echo suppression gain (at least in the higher part of the audio spectrum) to a local mean of the neighboring echo suppression gains (i.e. for neighboring frequencies). If the difference between the considered echo suppression gain and the local mean is higher than a predetermined threshold, a peak is detected, and the corresponding echo suppression gain may be reduced to reduce or remove the peak. Generally speaking, any peak detection and correction method known to the skilled person may be used, and the choice of a specific peak detection and correction method corresponds to a specific and non-limitative embodiment.

In FIG. 5, the smoothing in frequency is performed on the echo suppression gains. It should be noted that this smoothing in frequency can also be performed similarly on the enhanced sensor audio spectrum if not performed directly on the echo suppression gains.

Figure 6:
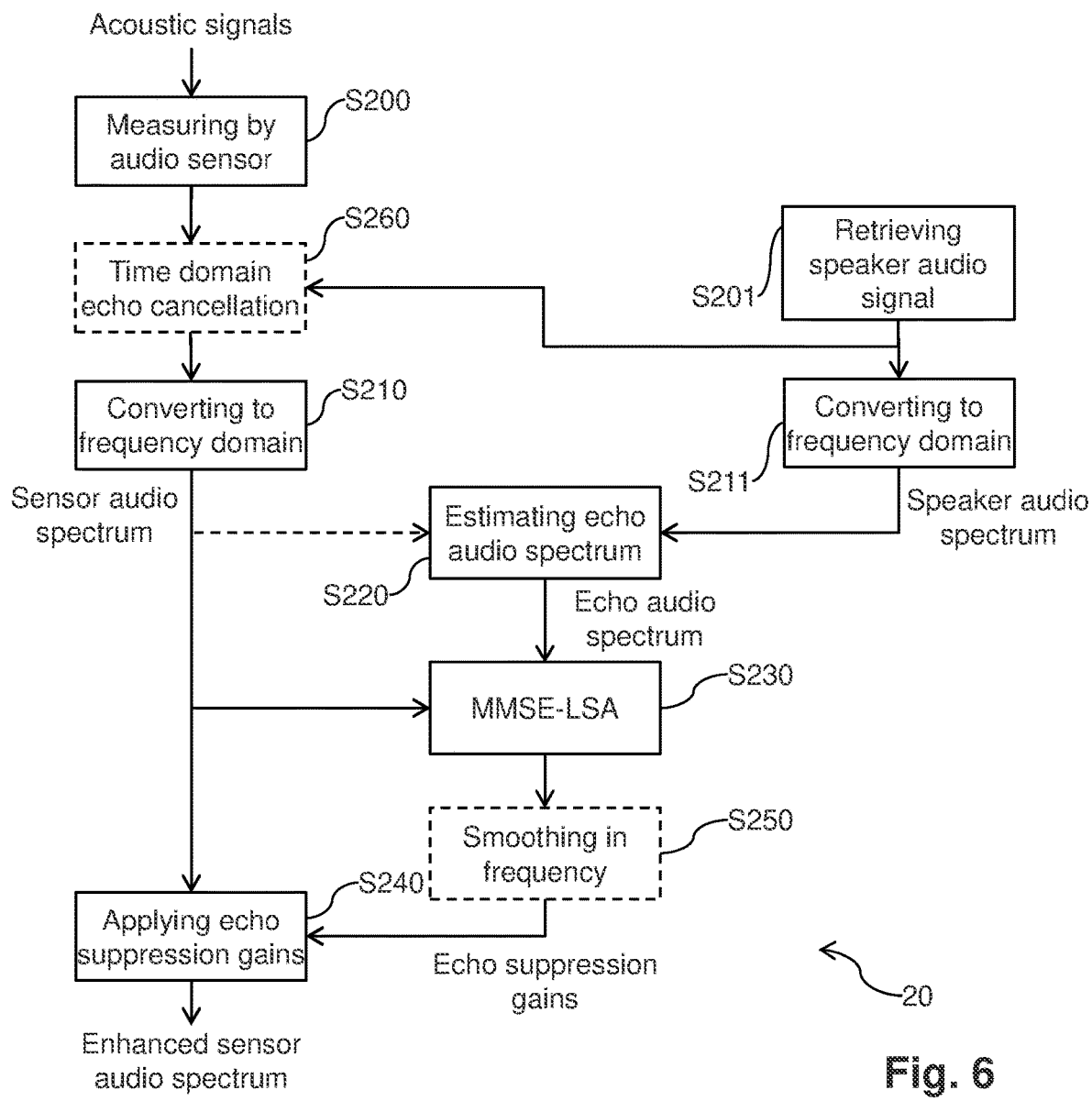
FIG. 6: a diagram representing the main steps of a third exemplary embodiment of the audio signal processing method.

It should be noted that the proposed echo suppression algorithm can be used alone, or in combination with other echo cancellation algorithms. FIG. 6 represents schematically the main steps of another exemplary embodiment of the audio signal processing method 20, in which the proposed MMSE-LSA-based solution is combined with time-domain echo cancellation algorithms. In addition to the steps discussed above in relation to FIG. 2, the audio signal processing method 20 of FIG. 6 comprises a step S260 of performing time domain echo cancellation on the sensor audio signal based on the speaker audio signal, executed by the processing circuit 13. Generally speaking, the step S260 may use any time domain echo cancellation method known to the skilled person, and the choice of a specific time domain echo cancellation method corresponds to a specific and non-limitative embodiment. For instance, the step S260 may use adaptive linear filtering techniques, for instance based on a Least Mean Square (LMS) filter or based on a Normalized LMS, NLMS, filter. For instance, performing time domain echo cancellation on the sensor audio signal based on the speaker audio signal comprises filtering the speaker audio signal by an adaptive filter, for instance using the sensor audio signal as reference for computing the error, and correcting the sensor audio signal based on the filtered speaker audio signal.

In some embodiments, the audio system 10 may comprise more than one audio sensor. In such a case, the proposed solution may be applied to mitigate echo in all, or only part of the sensor audio signals produced by the audio sensors of the audio system 10. In other words, the proposed solution is applied to at least one of the audio sensors of the audio system 10.

Figure 7:
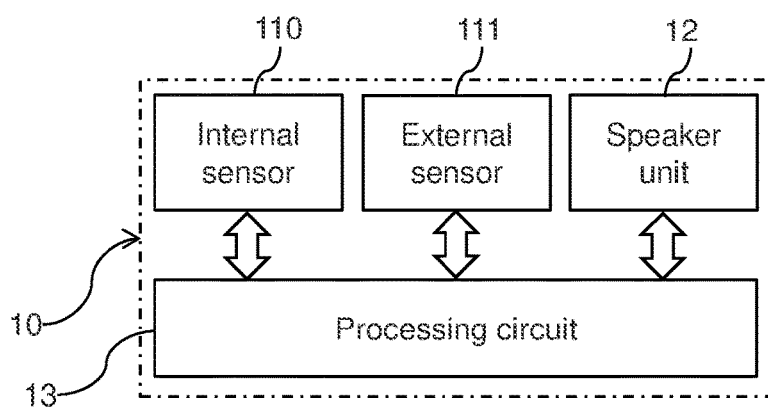
FIG. 7: a schematic representation of another exemplary embodiment of the audio system.

FIG. 7 represents schematically another exemplary embodiment of the audio system 10. As illustrated by FIG. 7, the audio system 10 comprises at least two audio sensors.

One of the audio sensors is referred to as internal sensor 110. The internal sensor 110 is referred to as "internal" because it is arranged to measure voice acoustic signals which propagate internally through the user's head. For instance, the internal sensor 110 may be an air conduction sensor (e.g. microphone) to be located in an ear canal of a user and arranged on the wearable device towards the interior of the user's head, or a bone conduction sensor (e.g. accelerometer, vibration sensor). The internal sensor 110 may be any type of bone conduction sensor or air conduction sensor known to the skilled person.

The other audio sensor is referred to as external sensor 111. The external sensor 111 is referred to as "external" because it is arranged to measure voice acoustic signals which propagate externally to the user's head (via the air between the user's mouth and the external sensor 111). The external sensor 111 is an air conduction sensor (e.g. microphone) to be located outside the ear canals of the user, or to be located inside an ear canal of the user but arranged on the wearable device towards the exterior of the user's head. The external sensor 111 may be any type of air conduction sensor known to the skilled person.

For instance, if the audio system 10 is included in a pair of earbuds (one earbud for each ear of the user), then the internal sensor 110 is for instance arranged with the speaker unit 12 in a portion of one of the earbuds that is to be inserted in the user's ear, while the external sensor 111 is for instance arranged in a portion of one of the earbuds that remains outside the user's ears. In some cases, the audio system 10 may comprise two or more internal sensors 110 (for instance one or two for each earbud) and/or two or more external sensors 111 (for instance one for each earbud) and/or two or more speaker units 12 (for instance one for each earbud).

In some cases, the audio signal processing method 20 may be applied to both an internal audio signal produced by the internal sensor 110 and an external audio signal produced by the external sensor 111.

In some cases, it is possible to consider the same frequency band $[f_1, f_N]$ for processing the internal audio signal and the external audio signal.

However, in other embodiments, it is also possible to consider different frequency bands for the internal audio sensor 110 and for the external audio sensor 111. For instance, it is possible to use a first frequency band $[f_{1,I}, f_{N,I}]$ for the internal sensor 110, with $f_1 \leq f_{1,I} < f_{N,I} \leq f_N$, and a second frequency band $[f_{1,E}, f_{N,E}]$ for the external sensor 111, with $f_1 \leq f_{1,E} < f_{N,E} \leq f_N$. Hence, in such cases, echo suppression gains may be computed and applied to the internal audio spectrum only on the first frequency band, and echo suppression gains may be computed and applied to the external audio spectrum only on the second frequency band.

In some cases, audio signals from the internal sensor and the external sensor can be mixed together for e.g. mitigating noise, by using the internal audio signal mainly for low frequencies while using the external audio signal for higher frequencies. Hence, in such cases, it might not be necessary to perform echo suppression in higher frequencies of the internal audio signal and, in preferred embodiments, the first and second frequency bands may be such that $f_{N,I} < f_{N,E}$. Similarly, it might not be necessary to perform echo suppression in lower frequencies of the external audio signal and, in preferred embodiments, the first and second frequency bands may be such that $f_{1,I} < f_{1,E}$. For instance, the internal audio signal is used mainly below a crossover frequency $f_{CROSS}$ and the external audio signal is used mainly above said crossover frequency $f_{CROSS}$. The crossover frequency $f_{CROSS}$ may be static over time or may be dynamically adjusted based on the operating conditions, and $f_{1,E} \leq f_{CROSS} \leq f_{N,I}$. Such different frequency bands may also be used even when the audio signals from the internal sensor and the external sensor are not mixed together.

It is emphasized that the present disclosure is not limited to the above exemplary embodiments. Variants of the above exemplary embodiments are also within the scope of the present invention.

REFERENCES

[EPHRAIM85] Ephraim, Y.; Malah, D., "Speech Enhancement Using a Minimum Mean-Square Error Log-Spectral Amplitude Estimator," IEEE Transactions on Acoustics, Speech and Signal Processing, vol. 33, no. 2, pp. 443-445, April 1985.

The invention claimed is:

1. An audio signal processing method implemented by an audio system which comprises at least an audio sensor and a speaker unit, wherein the speaker unit is configured to convert a speaker audio signal received as input into a speaker acoustic signal which is output by the speaker unit for a user of the audio system, wherein the audio signal processing method comprises:
   measuring, by the audio sensor, acoustic signals reaching the audio sensor, thereby producing a sensor audio signal,
   retrieving the speaker audio signal corresponding to the speaker acoustic signal output by the speaker unit while measuring the acoustic signals reaching the audio sensor to produce the sensor audio signal,
   converting the speaker audio signal to frequency domain, thereby producing a speaker audio spectrum,
   converting the sensor audio signal to frequency domain, thereby producing a sensor audio spectrum,
   estimating, based on the speaker audio spectrum, an echo audio spectrum of an echo audio signal caused by the speaker acoustic signal in the sensor audio signal,
   computing, based on the echo audio spectrum and the sensor audio spectrum, echo suppression gains to be applied to the sensor audio spectrum, by using a Minimum Mean Square Error-Log Spectral Amplitude, MMSE-LSA, estimator,
   applying the echo suppression gains to the sensor audio spectrum.

2. The audio signal processing method according to claim 1, wherein estimating the echo audio spectrum comprises:
   determining a spectral transfer function of an acoustic path from the speaker unit to the audio sensor,
   determining the echo audio spectrum by applying the spectral transfer function to the speaker audio spectrum.

3. The audio signal processing method according to claim 2, wherein the spectral transfer function is predetermined independently from the speaker audio spectrum and the sensor audio spectrum.

4. The audio signal processing method according to claim 2, wherein the spectral transfer function is dynamically adapted based on the speaker audio spectrum and the sensor audio spectrum.

5. The audio signal processing method according to claim 4, further comprising evaluating whether a spectral transfer function updating criterion is satisfied and, responsive to the spectral transfer function updating criterion being satisfied, updating the spectral transfer function by comparing the speaker audio spectrum and the sensor audio spectrum.

6. The audio signal processing method according to claim 5, wherein evaluating whether the spectral transfer function updating criterion is satisfied comprises at least one among the following:
   determining whether the sensor audio signal includes a voice audio signal corresponding to a voice acoustic signal emitted by the user, wherein the spectral transfer function updating criterion is satisfied when it is determined that the sensor audio signal does not include a voice audio signal, and/or
   determining whether the sensor audio signal includes a noise audio signal having a noise level below a predetermined noise threshold, wherein the spectral transfer function updating criterion is satisfied when it is determined that the noise level is below said predetermined noise threshold, and/or
   determining whether the sensor audio signal includes an echo audio signal having an echo level above a predetermined echo threshold, wherein the spectral transfer function updating criterion is satisfied when it is determined that the echo level is above said predetermined echo threshold.

7. The audio signal processing method according to claim 5, wherein the spectral transfer function updating criterion is evaluated for a plurality of frequencies or frequency sub-bands and the spectral transfer function is updated for each frequency or frequency sub-band for which the spectral transfer function updating criterion is satisfied.

8. The audio signal processing method according to claim 1, further comprising smoothing in frequency the echo suppression gains, or the sensor audio spectrum obtained after applying the echo suppression gains.

9. The audio signal processing method according to claim 1, wherein the audio system comprises two or more audio sensors which comprise an internal sensor and an external sensor, wherein the internal sensor is arranged to measure acoustic signals which reach the internal sensor by propagating internally to a head of the user and the external sensor is arranged to measure acoustic signals which reach the external sensor by propagating externally to the user's head, wherein:
   echo suppression gains are computed on a first frequency band for an internal audio spectrum of an internal audio signal produced by the internal sensor,
   echo suppression gains are computed on a second frequency band for an external audio spectrum of an external audio signal produced by the external sensor, wherein the second frequency band is different from the first frequency band and includes frequencies which are greater than a maximum frequency of the first frequency band.

10. The audio signal processing method according to claim 1, wherein the MMSE-LSA estimator uses an exponential integral function which is approximated by a linear function.

11. An audio system comprising at least an audio sensor and a speaker unit, wherein the speaker unit is configured to convert a speaker audio signal received as input into a speaker acoustic signal for a user of the audio system, wherein the audio sensor is configured to produce a sensor audio signal by measuring acoustic signals reaching the audio sensor, wherein said audio system further comprises a processing circuit configured to:
- retrieve the speaker audio signal corresponding to the speaker acoustic signal output by the speaker unit while measuring the acoustic signals reaching the audio sensor to produce the sensor audio signal,
- convert the speaker audio signal to frequency domain, thereby producing a speaker audio spectrum,
- convert the sensor audio signal to frequency domain, thereby producing a sensor audio spectrum,
- estimate, based on the speaker audio spectrum, an echo audio spectrum of an echo audio signal caused by the speaker acoustic signal in the sensor audio signal,
- compute, based on the echo audio spectrum and the sensor audio spectrum, echo suppression gains to be applied to the sensor audio spectrum, by using a Minimum Mean Square Error-Log Spectral Amplitude, MMSE-LSA, estimator,
- apply the echo suppression gains to the sensor audio spectrum.

12. The audio system according to claim 11, wherein the processing circuit is configured to estimate the echo audio spectrum by:
- determining a spectral transfer function of an acoustic path from the speaker unit to the audio sensor,
- determining the echo audio spectrum by applying the spectral transfer function to the speaker audio spectrum.

13. The audio system according to claim 12, wherein the spectral transfer function is predetermined independently from the speaker audio spectrum and the sensor audio spectrum.

14. The audio system according to claim 12, wherein the processing circuit is configured to dynamically adapt the spectral transfer function based on the speaker audio spectrum and the sensor audio spectrum.

15. The audio system according to claim 14, wherein the processing circuit is further configured to evaluate whether a spectral transfer function updating criterion is satisfied and, responsive to the spectral transfer function updating criterion being satisfied, update the spectral transfer function by comparing the speaker audio spectrum and the sensor audio spectrum.

16. The audio system according to claim 15, wherein evaluating whether the spectral transfer function updating criterion is satisfied comprises at least one among the following:
- determining whether the sensor audio signal includes a voice audio signal corresponding to a voice acoustic signal emitted by the user, wherein the spectral transfer function updating criterion is satisfied when it is determined that the sensor audio signal does not include a voice audio signal, and/or
- determining whether the sensor audio signal includes a noise audio signal having a noise level below a predetermined noise threshold, wherein the spectral transfer function updating criterion is satisfied when it is determined that the noise level is below said predetermined noise threshold, and/or
- determining whether the sensor audio signal includes an echo audio signal having an echo level above a predetermined echo threshold, wherein the spectral transfer function updating criterion is satisfied when it is determined that the echo level is above said predetermined echo threshold.

17. The audio system according to claim 15, wherein the processing circuit is configured to evaluate the spectral transfer function updating criterion for a plurality of frequencies or frequency sub-bands and to update said spectral transfer function for each frequency or frequency sub-band for which the spectral transfer function updating criterion is satisfied.

18. The audio system according to claim 11, wherein the processing circuit is further configured to smooth in frequency the echo suppression gains, or the sensor audio spectrum obtained after applying the echo suppression gains.

19. The audio system according to claim 11, wherein the audio system comprises two or more audio sensors which comprise an internal sensor and an external sensor, wherein the internal sensor is arranged to measure acoustic signals which reach the internal sensor by propagating internally to a head of the user and the external sensor is arranged to measure acoustic signals which reach the external sensor by propagating externally to the user's head, wherein the processing circuit is further configured to:
- compute echo suppression gains on a first frequency band for an internal audio spectrum of an internal audio signal produced by the internal sensor,
- compute echo suppression gains on a second frequency band for an external audio spectrum of an external audio signal produced by the external sensor, wherein the second frequency band is different from the first frequency band and includes frequencies which are greater than a maximum frequency of the first frequency band.

20. The audio system according to claim 11, wherein the MMSE-LSA estimator uses an exponential integral function which is approximated by a linear function.

21. A non-transitory computer readable medium comprising computer readable code to be executed by an audio system comprising at least an audio sensor and a speaker unit, wherein the speaker unit is configured to convert a speaker audio signal received as input into a speaker acoustic signal which is output by the speaker unit for a user of the audio system, wherein said audio system further comprises a processing circuit, wherein said computer readable code causes said audio system to:
- measure, by the audio sensor, acoustic signals reaching the audio sensor, thereby producing a sensor audio signal,
- retrieve the speaker audio signal corresponding to the speaker acoustic signal output by the speaker unit while measuring the acoustic signals reaching the audio sensor to produce the sensor audio signal,
- convert the speaker audio signal to frequency domain, thereby producing a speaker audio spectrum,
- convert the sensor audio signal to frequency domain, thereby producing a sensor audio spectrum,
- estimate, based on the speaker audio spectrum, an echo audio spectrum of an echo audio signal caused by the speaker acoustic signal in the sensor audio signal,
- compute, based on the echo audio spectrum and the sensor audio spectrum, echo suppression gains to be applied to the sensor audio spectrum, by using a Minimum Mean Square Error-Log Spectral Amplitude, MMSE-LSA, estimator,
- apply the echo suppression gains to the sensor audio spectrum.

\* \* \* \* \*